(No Model.)
M. L. SENDERLING.
DUMP WAGON.
No. 509,105. Patented Nov. 21, 1893.
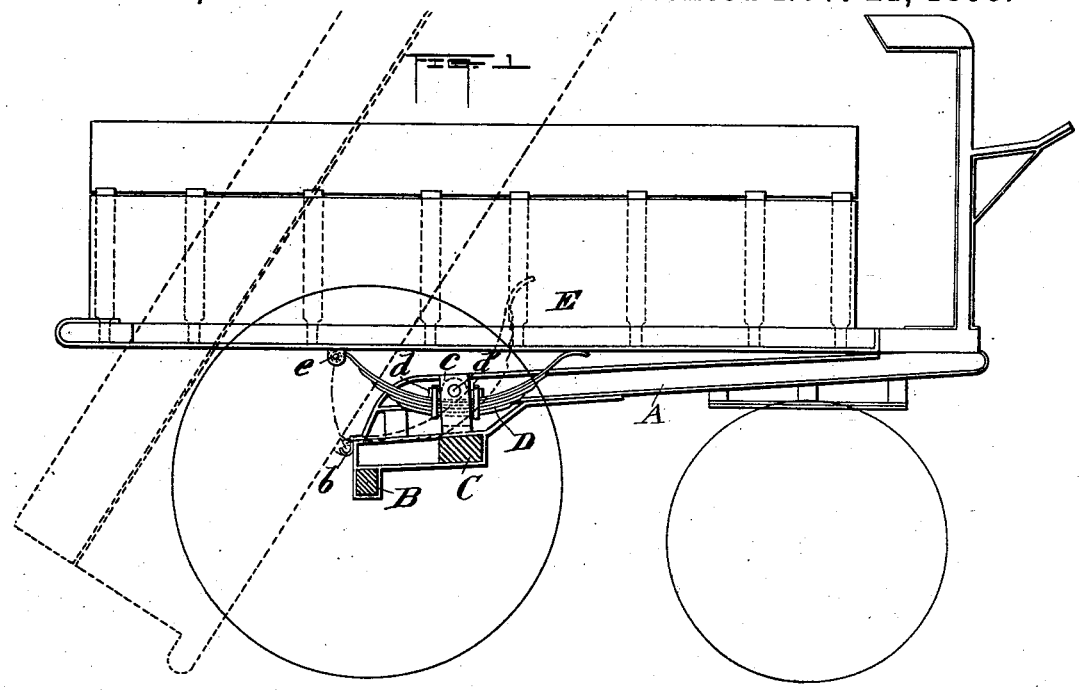
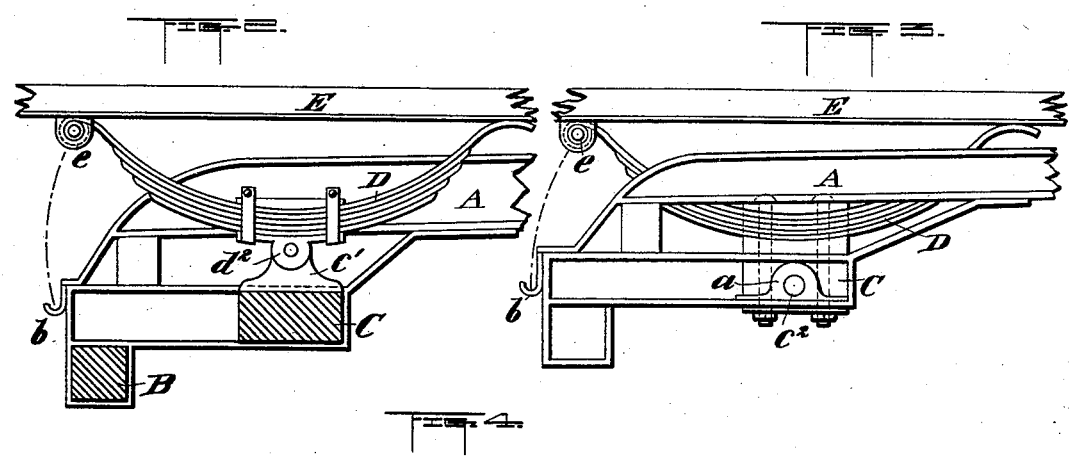
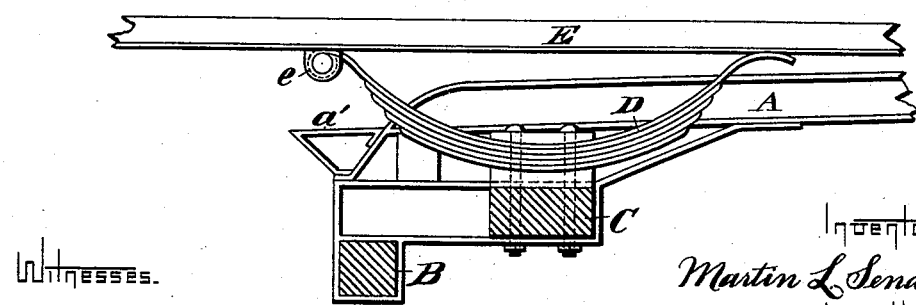
Witnesses
Robert Baconsword
George Barry.
Inventor
Martin L. Senderling,
by attorneys.
Brown & Seward

United States Patent Office.

MARTIN L. SENDERLING, OF JERSEY CITY, NEW JERSEY.

DUMP-WAGON.

SPECIFICATION forming part of Letters Patent No. 509,105, dated November 21, 1893.

Application filed December 9, 1892. Serial No. 454,566. (No model.)

*To all whom it may concern:*

Be it known that I, MARTIN L. SENDERLING, of Jersey City, in the county of Hudson and State of New Jersey, have invented a new and useful Improvement in Dump-Wagons, of which the following is a specification.

My invention relates to an improvement in dump wagons in which the body is mounted on a spring supported upon the running gear frame forward of the rear axle.

A practical embodiment of my invention is represented in the accompanying drawings, in which—

Figure 1 is a view of a wagon in side elevation, partly in section, showing in dotted lines the position of the body when tilted to dump, and Figs. 2, 3 and 4 are views in detail representing different ways of mounting the body supporting spring upon the running gear frame.

In the form shown in Fig. 1, the running gear frame is denoted by A and is fixed at its rear end to the rear axle B in any well known or approved manner. The cross bar C of the running gear frame is utilized in this instance as a support for the body supporting spring. As represented in Fig. 1, the cross bar C is fixed to the frame A and is provided at intervals thereon with uprising bifurcated standards $c$. The supporting springs are denoted by D and have fixed centrally to their upper sides blocks $d$ provided with perforations for the passage of supporting pins $d'$ which, when the parts are assembled, extend through the branches of the bifurcated standards $c$ and through the blocks $d$ fixed to the spring. It is intended that the block $d$ shall have a free rocking movement on the pin $d'$ and when the spring is supported between the branches of the standard $c$ it is intended that it shall be held by the pin $d'$ a short distance above the bottom of the opening between the branches of the standard $c$ thereby throwing the entire weight of the spring and the load carried thereby upon the pin $d'$.

The body of the wagon is denoted in the present instance by E and it is pivotally secured to the rear end of the spring D, as at $e$. The body E when in its normal position rests also upon the forward end of the spring D, the engagement of the forward end of the said spring with the body being such as to permit the spring at that end to slide freely from front to rear to adjust itself to the varying weights of the loads, and also such as to permit the body to be freely lifted from the forward end of the spring when the body is tilted to dump.

In operation, the body when in its normal position as shown in full lines in Fig. 1, rests upon the opposite ends of the springs D and the load thus placed upon the springs is transferred to the supporting pins $d'$ on which the springs are pivoted, and thence to the cross bar C on the frame A. The body of the wagon may be so connected with the spring that the center of the load shall be slightly forward of the supporting pins $d'$. When it is desired to dump the load, the body and springs may be rocked upon the supporting pins $d'$ until the pivotal connection $e$ at the rear end of the spring rests in a bearing $b$ provided therefor above and a little to the rear of the axle, and the further tilting movement of the body will take place upon the bearing $b$ as the fulcrum, the forward portion of the body separating from the forward end of the spring D, as indicated in dotted lines in Fig. 1. This will transfer the pivotal point from the position which it occupied at the beginning of the tilting movement to a point in the neighborhood of the axle as the center of gravity of the load moves rearwardly during the tilting movement of the body.

The supporting spring D, it will be observed, has a three fold function in the structure hereinbefore described, viz., a spring cushion on which the load rides, a tilting support on which the load during the first part of its tilting movement is rocked, and a link for holding the pivotal connection $e$ in its bearing $b$ after the body has been tilted into position to move upon its second fulcrum. It will be also observed that by supporting the spring at a point forward of the axle B, I am enabled to bring the point of support near the center of gravity of the load when the latter is in its normal position without unduly projecting the body to the rear of the rear axle.

In the form shown in Fig. 2, the spring D instead of being suspended from standards on the cross bar C rests and rocks on a suitable bearing $c'$, fixed on the bar C and to this end the said spring D is provided with a bearing piece $d^2$ on its under side. The rocking movement of the spring is quite similar to that described in referring to Fig. 1.

In the form shown in Fig. 3, the spring D is bolted directly to the cross bar C, the latter being in this case provided with journals $c^2$ adapted to rock in suitable bearings $a$ secured to the frame A. In this structure the bar C and spring D rock together when the body is tilted.

In the form shown in Fig. 4, the spring D is firmly bolted to the cross bar C and the latter is fixed to the frame A so that the only tilting movement of the spring will be due to the yielding of its rearward section when the load is transferred entirely thereon by the tilting of the body and the consequent lifting of the body from the forward end of the spring.

To prevent the spring from being subjected to a load which shal spring it so far as to give it a permanent set or break it, I provide a stop $a'$ on which the pivotal connection $e$ will rest when the rear end of the spring has reached the safe limit of movement.

What I claim is—

1. A wagon body and a body supporting spring to which the body is secured the said spring being pivotally supported intermediate of its length at a point forward of the rear axle, substantially as set forth.

2. A wagon body, a body supporting spring to the rear end of which the body is pivotally secured, the body being adapted to rest upon but free to separate from the forward end of the spring and a support for the spring on the running gear frame, substantially as set forth.

3. A wagon body, a body supporting spring to which the body is pivotally secured, and a spring support on the running gear frame with which the spring has a rocking connection, substantially as set forth.

4. A wagon body, a body supporting spring to which the body is pivotally secured, a spring support fixed to the running gear frame and means for suspending the spring from the said fixed support in rocking adjustment, substantially as set forth.

5. A wagon body, a body supporting spring to which the body is pivotally secured, a spring support to which the spring is pivotally secured and a bearing to the rear of the spring support upon which the body is adapted to fulcrum after it has been tilted on the pivotal connection of the spring with its support, substantially as set forth.

MARTIN L. SENDERLING.

Witnesses:
  FREDK. HAYNES,
  GEORGE BARRY.